United States Patent
Paschal

(10) Patent No.: US 12,549,326 B2
(45) Date of Patent: Feb. 10, 2026

(54) ENHANCED PPM FREQUENCY OFFSET DETECTOR

(71) Applicant: International Business Machines Corporation, Armonk, NY (US)

(72) Inventor: Matthew James Paschal, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 33 days.

(21) Appl. No.: 18/654,805

(22) Filed: May 3, 2024

(65) Prior Publication Data

US 2025/0343669 A1 Nov. 6, 2025

(51) Int. Cl.
*H04L 7/00* (2006.01)
*G06F 1/12* (2006.01)

(52) U.S. Cl.
CPC .............. *H04L 7/0054* (2013.01); *G06F 1/12* (2013.01)

(58) Field of Classification Search
CPC ....... H04L 7/0054; G06F 1/12; G01R 23/005; H03D 13/00
See application file for complete search history.

(56) References Cited

U.S. PATENT DOCUMENTS

| | | | |
|---|---|---|---|
| 7,154,305 B2* | 12/2006 | Driediger | G01R 23/005 327/47 |
| 7,292,070 B1* | 11/2007 | Park | H03K 19/1774 327/47 |
| 7,555,087 B1 | 6/2009 | Asaduzzaman et al. | |
| 9,755,820 B2 | 9/2017 | Liu et al. | |
| 9,887,701 B1 | 2/2018 | Schoch | |
| 10,313,104 B2 | 6/2019 | Dvir et al. | |
| 10,425,123 B2 | 9/2019 | Srivastava | |
| 10,666,269 B2 | 5/2020 | Spijker | |
| 11,038,511 B2 | 6/2021 | Weeks et al. | |
| 11,526,193 B2* | 12/2022 | Ranganathan | G06F 1/12 |
| 11,658,852 B2 | 5/2023 | Chan et al. | |
| 2012/0166121 A1 | 6/2012 | Yang et al. | |
| 2021/0392600 A1 | 12/2021 | Schmandt et al. | |

(Continued)

FOREIGN PATENT DOCUMENTS

CN 101452019 A * 6/2009

OTHER PUBLICATIONS

Jin et al.; "Optical OFDM Synchronization With Symbol Timing Offset and Sampling Clock Offset Compensation in Real-Time IMDD Systems", JPHOT IEEE Photonics Journal, vol. 3, No. 2, pp. 187-196, Apr. 2011.

(Continued)

*Primary Examiner* — Betsy Deppe
(74) *Attorney, Agent, or Firm* — Patterson + Sheridan, LLP

(57) ABSTRACT

Embodiments herein describe circuitry and techniques to implement an enhanced PPM frequency offset detector and methods for implementing operational functions of one or more embodiments of the PPM frequency offset detector to detect a frequency offset between two clock signals. An enhanced PPM frequency offset detector of one or more embodiments reduces circuitry and power requirements, eliminating circuitry requirements of a third reference clock signal to detect the frequency offset of some traditional arrangements, and effectively and efficiently detects a PPM frequency offset between two clock signals.

20 Claims, 6 Drawing Sheets

(56) References Cited

U.S. PATENT DOCUMENTS

2022/0286989 A1     9/2022   Zhang et al.
2023/0308104 A1     9/2023   Nelson

OTHER PUBLICATIONS

Tirado-Andres et al.; "Performance of Clock Sources and Their Influence on Time Synchronization in Wireless Sensor Networks", DSN International Journal of, vol. 15, Iss. 9, pp. 1-16, Sep. 28, 2019.

Halder et al.; "COIDS: A Clock Offset Based Intrusion Detection System for Controller Area Networks", ICDCN'20 21st ACM Inter. Conf. on, Article 22, pp. 1-10, Jan. 4-7, 2020.

Hu et al.; "Comparison of Interpolation-Based Sampling Frequency Offset Compensation Schemes for Practical OFDM-VLC Systems", Optics Express, vol. 28, No. 2, pp. 2337-2348, Jan. 20, 2020.

Zhang et al.; "A Single Pilot Subcarrier-Based Sampling Frequency Offset Estimation and Compensation Algorithm for Optical OFDM Systems", JPHOT IEEE Photonics Journal, vol. 8, No. 5, pp. 1-11, Oct. 2016.

\* cited by examiner

ENHANCED PPM FREQUENCY OFFSET DETECTOR

BACKGROUND

The present invention relates to digital processing systems, and more specifically, to methods and circuitry for implementing an enhanced PPM (parts per million) frequency offset detector to detect a frequency offset between two clock signals.

PPM frequency offset detectors, also called PPM Watchdogs, are used to detect clock errors or clock signal drift in clock sources of computer processing units, integrated circuits, or the like. New techniques, systems, and circuitry for implementing an enhanced PPM frequency offset detector are needed to detect a frequency offset between two clock signals, for example, to eliminate the requirement of a third reference clock signal, reduce power requirements, and circuitry requirements to effectively and efficiently detect an PPM frequency offset between two clock signals.

SUMMARY

Embodiments of the present disclosure provide methods, systems, and circuitry for implementing an enhanced PPM frequency offset detector to detect a frequency offset between two clock signals.

According to one embodiment of the present disclosure, a frequency offset detector comprises: a first source counter receiving and counting a first clock signal; a second source counter receiving and counting a second clock signal; an offset counter clock controller coupled to the first source counter, the second source counter, and the offset counter clock controller configured to receive the first clock signal, the second clock signal, a count output of the first source counter, and a count output of second source counter; a PPM (parts per million) frequency offset counter coupled to the offset counter clock controller to detect a frequency offset between the first clock signal and the second clock signal, where the offset counter clock controller is configured to: detect a faster clock signal of the first clock signal and the second clock signal; apply the faster clock signal to the PPM frequency offset counter; enable counting the faster clock signal, by the PPM frequency offset counter, based on the count output of the faster clock signal; and disable counting the faster clock signal, by the PPM frequency offset counter, based on the count output of the slower clock signal.

According to one embodiment of the present disclosure, a method comprises receiving, by a first source counter, a first clock signal from a first clock signal source; receiving, by a second source counter, a second clock signal from a second clock signal source; an offset counter clock controller; transmitting by the first source counter, a first count output of the first source counter, to an offset counter clock controller; transmitting by the second source counter, a second count output of the second source counter, to the offset counter clock controller; receiving, by the offset counter clock controller, the first clock signal and the second clock signal; and detecting by the offset counter clock controller, a faster clock signal of the first clock signal and the second clock signal, to apply to a PPM (parts per million) frequency offset counter, and where the offset counter clock controller enables counting the faster clock signal, by the PPM frequency offset counter, based on a count value of the faster clock signal, and disables the counting the faster clock signal based on the count output of the slowest clock signal, to detect a frequency offset between the first clock signal and the second clock signal, and where the PPM frequency offset counter generates an error signal output based on counting the faster clock signal.

DETAILED DESCRIPTION

Figure 1:
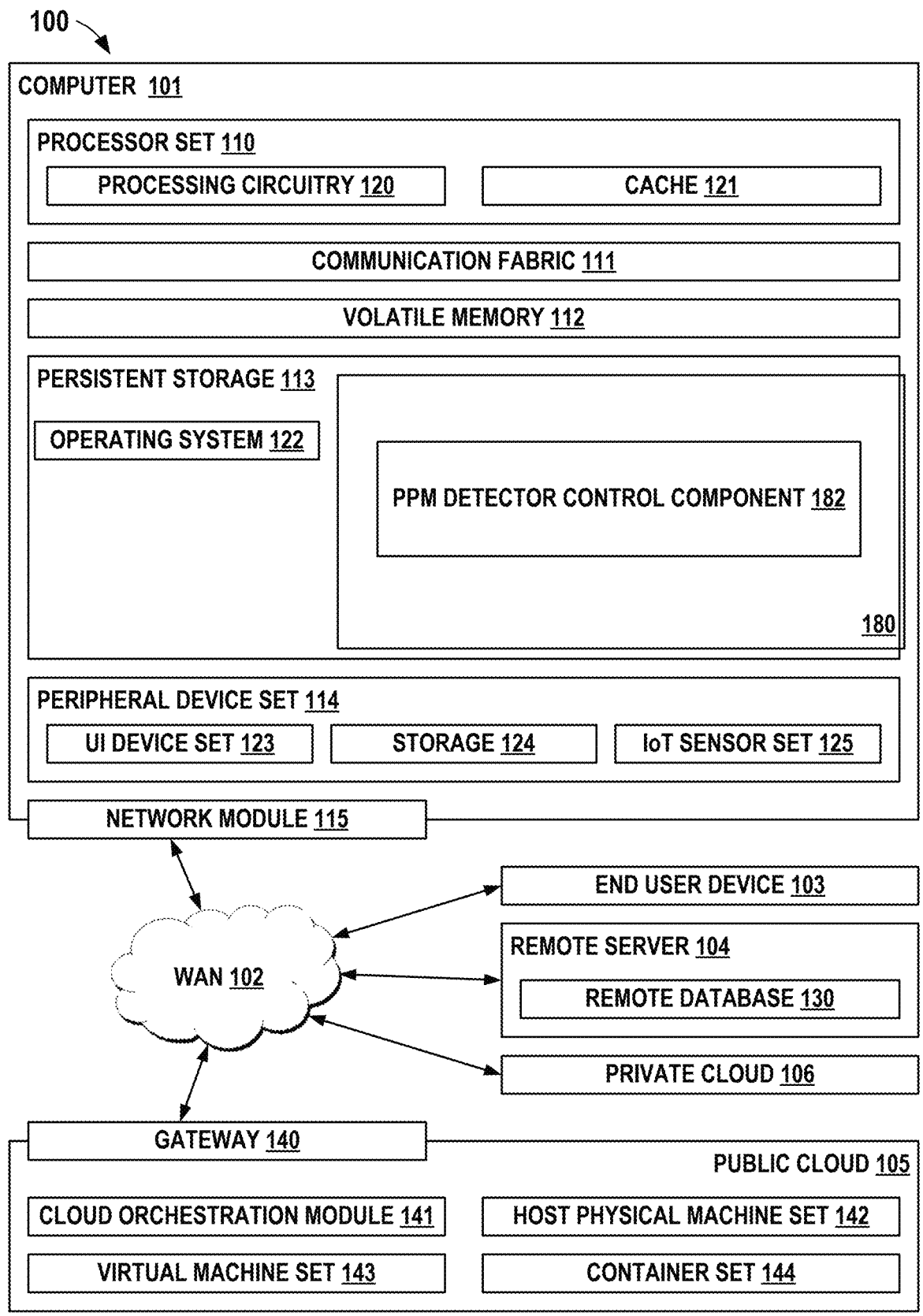
FIG. 1 is a block diagram of an example computer environment for use in conjunction with one or more disclosed embodiments.

Embodiments herein describe circuitry and techniques to implement an enhanced PPM frequency offset detector and methods for implementing operational functions of one or more embodiments of the PPM frequency offset detector to detect a frequency offset between two clock signals. An enhanced PPM frequency offset detector of one or more embodiments reduces circuitry and power requirements, eliminating circuitry requirements of a third reference clock signal of some traditional arrangements, and effectively and efficiently detects a PPM frequency offset between two clock signals.

In one embodiment, two asynchronous clock signals CLK_A, CLK_B (e.g., from a first clock source A, and a second clock source B) are applied to respective M-bit counters A, B (e.g., 21-bit counter or any M-bit counter A, B). Each M-bit counter A, B is initialized to an zero (0) state before being enabled to start counting the respective asynchronous clock signals CLK_A, CLK_B. With a frequency offset between the two asynchronous clock signals CLK_A, CLK_B, one of the respective bits BIT_N_A or BIT_N_B (digital count signals) goes high prior to the other BIT_N_B or BIT_N_A, if CLK_A or CLK_B is faster than CLK_B or CLK_A. The digital count signals BIT_N_A and BIT_N_B feed a downstream offset counter clock controller, which also receives the asynchronous clock signals CLK_A, CLK_B. The offset counter clock controller detects a faster clock signal of the first clock signal CLK_A and the second clock signal CLK_B and applies the faster clock signal to an input of a PPM frequency offset counter. The offset counter clock controller enables counting by the PPM frequency offset counter synchronously with the highest frequency clock or fastest clock of the first clock source A and the second clock source B. The offset counter clock controller disables counting by the PPM frequency offset counter synchronously with the lowest frequency clock of the first clock source A and the second clock source B. The PPM frequency offset counter generates an error signal output based on counting the faster clock signal.

Some non-limiting advantages of the present disclosure are that the enhanced PPM frequency offset detector does not require a phase locked loop (PLL), loop filters, or creating PPM ranges to calculate a frequency offset or difference, as used in some known envelope detecting units. The disclosed PPM frequency offset detector uses two latches to detect a faster clock signal between two clock signals that is used to detect frequency offset between the two clock signals, which is effective to implement. In one embodiment, the disclosed PPM frequency offset detector uses cascaded asynchronous latches providing a retimed offset clock enable with the faster clock to avoid susceptibility to clock slivering, (i.e., a sliver clock pulse is a short duration clock pulse) which can prevent inaccurate counts for low PPM frequency offsets. The disclosed PPM frequency offset detector enables self-resetting when counts of the fast clock signal and the slow clock signal are reached.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a PPM Detector Control Component 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
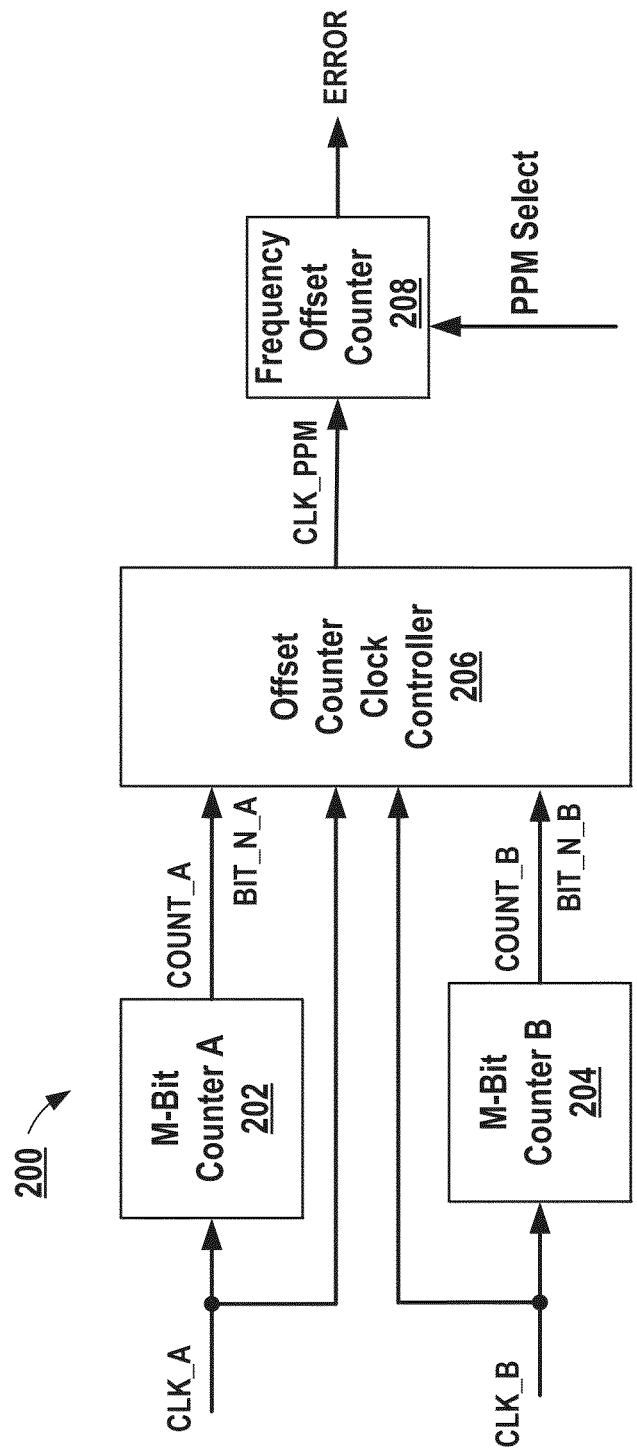
FIG. 2 is a schematic and block diagram of an example PPM frequency offset detector of one or more disclosed embodiments.

FIG. 2 illustrates an example PPM frequency offset detector 200 to detect a frequency offset between two clock signals of one or more disclosed embodiments. PPM frequency offset detector 200 can be used in conjunction with the computer 101 and cloud environment of the computing environment 100 of FIG. 1 with the PPM Detector Control Component 182 for implementing methods according to one or more embodiments.

In accordance with the present disclosure, PPM frequency offset detector 200 detects a frequency offset between two clock signals, CLK_A and CLK_B from an independent first clock source and a second clock source, without using an additional independent reference clock, or third reference clock of some conventional arrangements. PPM frequency offset detector 200 effectively and efficiently detects a frequency offset between the asynchronous clock signals CLK_A and CLK_B, eliminating the need for a phase locked loop (PLL), loop filters, or creating PPM ranges to calculate a frequency offset or difference, often used in conventional envelope detecting arrangements.

PPM frequency offset detector 200 includes a pair of M-bit counters A 202, and B 204 respectively receiving the independent, asynchronous first and second clock signals CLK_A and CLK_B. For example, the M-bit counters A 202, and B 204 can be implemented with 21-bit counters or various other M-bit counters. PPM frequency offset detector 200 includes an offset counter clock controller 206 and a frequency offset counter 208. The offset counter clock controller 206 receives at its inputs, count outputs BIT_N_A and BIT_N_B of the M-bit counters A 202, and B 204, and the asynchronous first and second clock signals CLK_A and CLK_B. The outputs BIT_N_A and BIT_N_B of the M-bit counters A 202, and B 204 comprise a programmable N-bit count of the M-bit counters. The offset counter clock controller 206 detects the faster clock signal of the first and second clock signals CLK_A and CLK_B and applies the faster clock signal CLK_PPM to the frequency offset counter 208.

In one embodiment, two asynchronous first and second clock signals CLK_A and CLK_B are applied to the M-bit counters A 202 and B 204, respectively. Each M-bit counter A 202, and B 204 is initialized to a zero (0) state before being enabled to start counting the respective asynchronous clock signals CLK_A and CLK_B. In operation, with a frequency offset between the two asynchronous clock signals CLK_A and CLK_B, one of the respective bits BIT_N_A or BIT_N_B (digital data signals) goes high earlier than BIT_N_B or BIT_N_A, depending on a faster clock signal of the first source clock signal CLK_A or the second source clock signal CLK_B. The digital data signals outputs BIT_N_A and BIT_N_B of M-bit counters A 202 and B 204 to the downstream offset counter clock controller 206. The offset counter clock controller 206 applies, the faster clock signal, indicated at line CLK_PPM, to the PPM frequency offset counter 208 for counting the higher frequency clock of the first clock source signal CLK_A or the second clock source signal CLK_B. The offset counter clock controller 206 enables the PPM frequency offset counter 208 to start counting synchronously with the faster clock signal (e.g., based on a bit count of M-bit counter A 202, or the M-bit counter B 204) of the first clock signal CLK_A and the second clock signal CLK_B, such as based on BIT_N_A going high (e.g., with fast clock source signal CLK_A). The offset counter clock controller 206 disables the PPM frequency offset counter 208 to stop counting synchronously with the lower frequency clock, of the first clock source signal CLK_A and the second clock source CLK_B, such as based on BIT_N_B going high (e.g., with slow clock source signal CLK_B), such as illustrated in FIG. 5.

Figure 5:
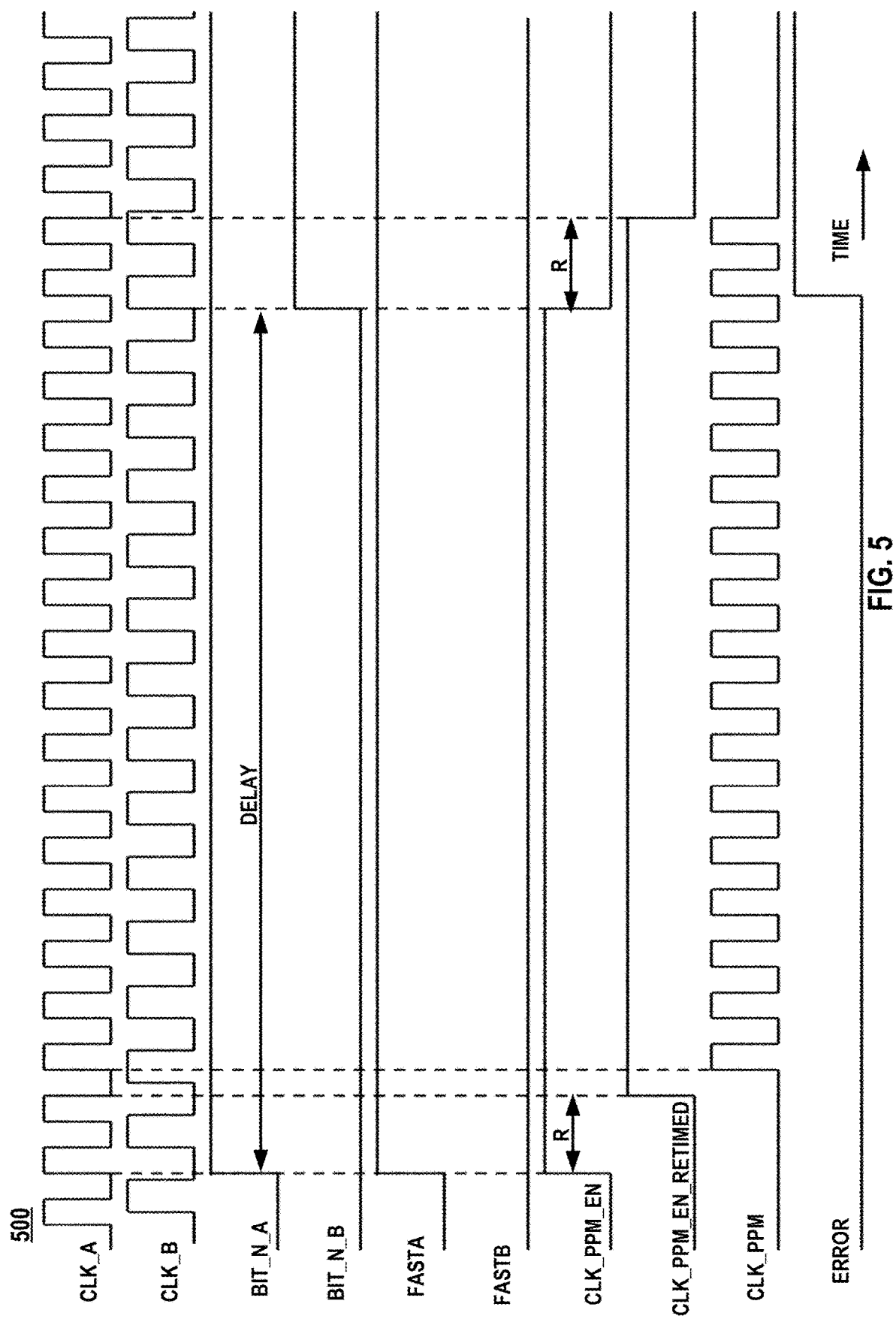
FIG. 5 is a chart providing example illustrative PPM detector waveforms of the PPM frequency offset detector of FIG. 2 of one or more disclosed embodiments.

FIG. 5 illustrates example illustrative PPM detector waveforms 500 of the PPM frequency offset detector 200 of one or more disclosed embodiments. In FIG. 5, an illustrated first clock signal CLK_A is faster than an illustrated second clock signal CLK_B. As shown, waveform BIT_N_A of the fast first clock signal CLK_A goes high, followed by a time delay interval until waveform BIT_N_B of the slow second clock signal CLK_B goes high, as indicated by an Arrow DELAY, which represents a time delay interval associated with a frequency offset between the first clock source signal CLK_A and the second clock source CLK_B.

Figure 3:
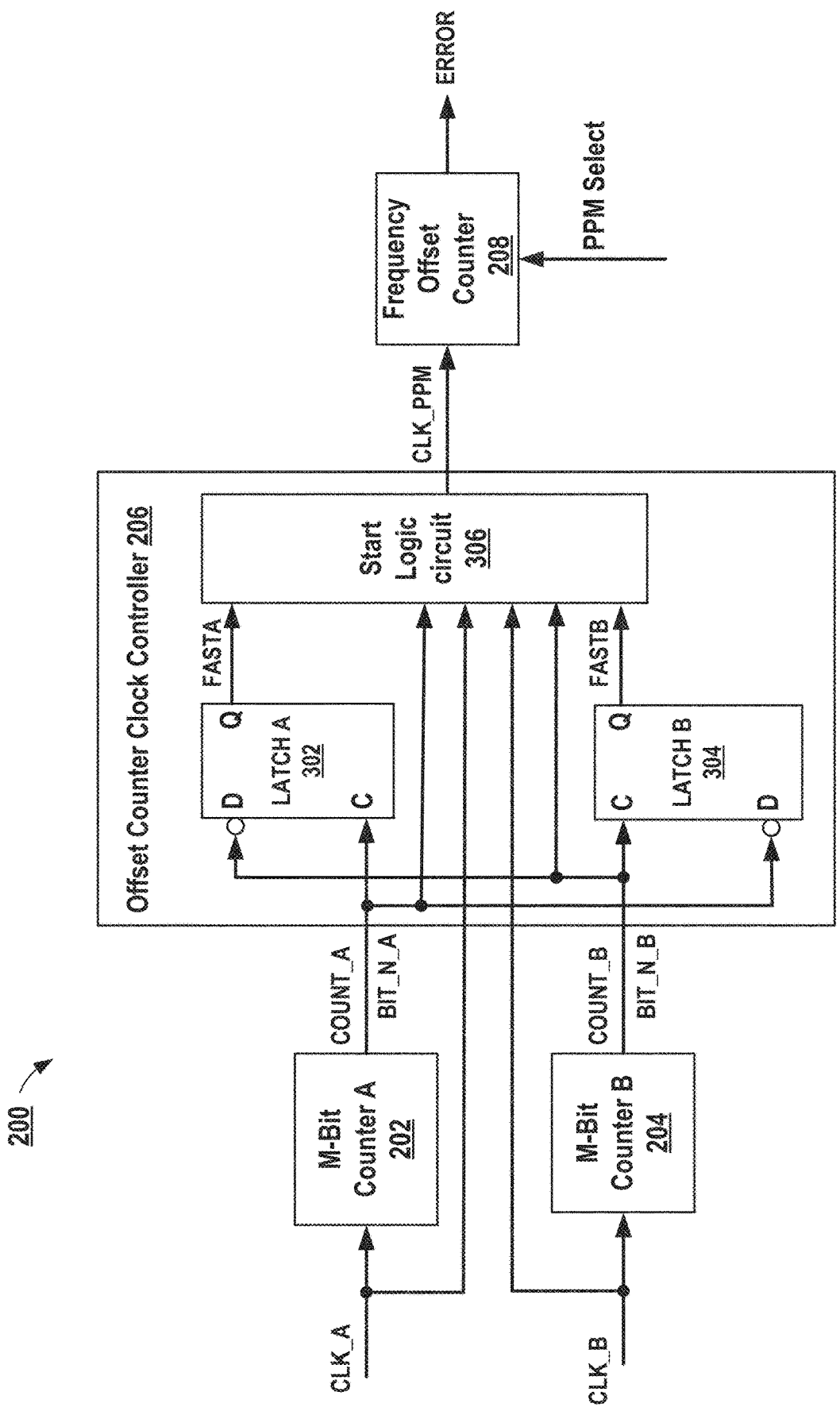
FIG. 3 is a schematic and block diagram illustrating details of an example offset counter clock controller of the PPM frequency offset detector of FIG. 2 of one or more disclosed embodiments.
Figure 4:
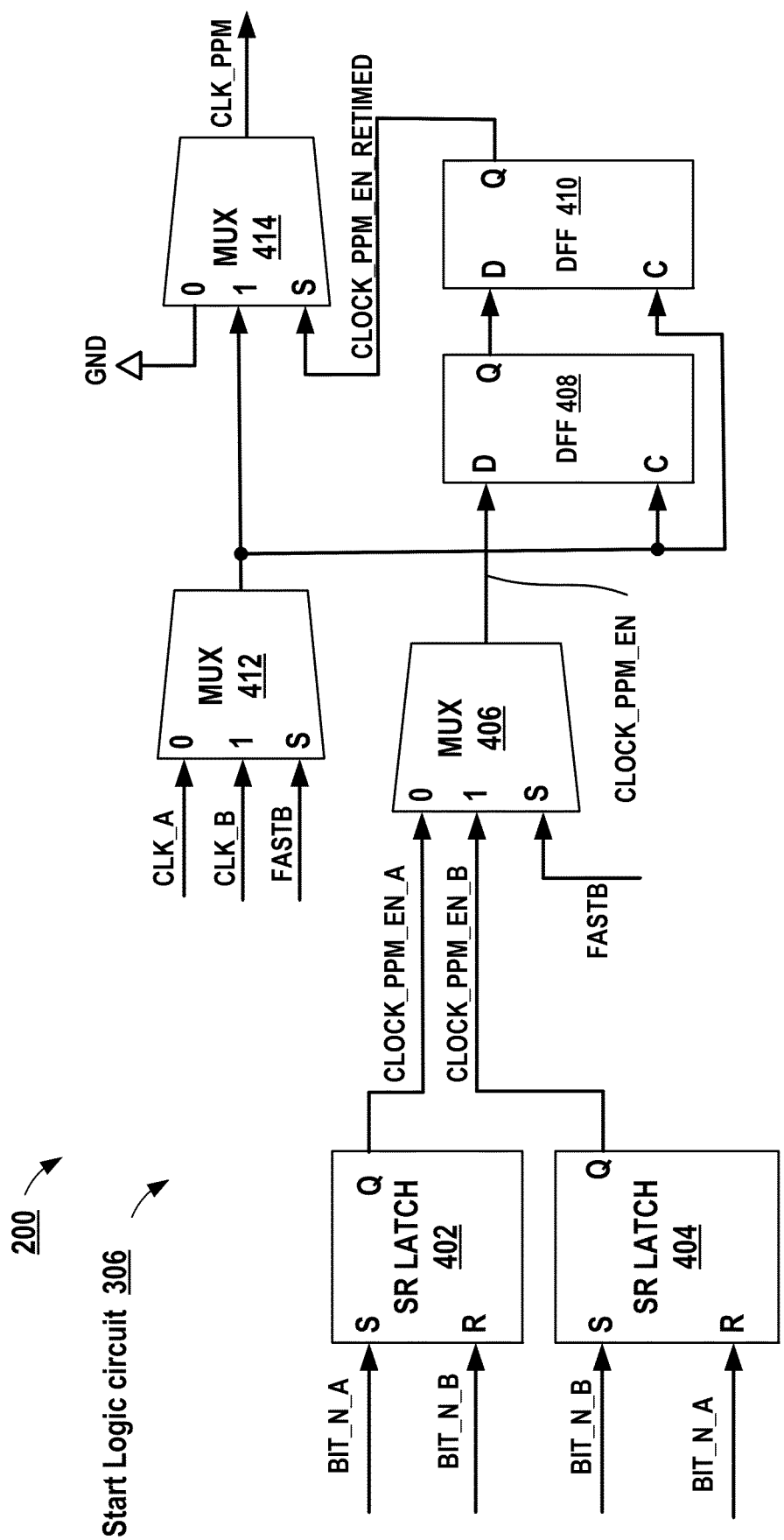
FIG. 4 is a schematic and block diagram illustrating details of an example start logic circuit of the offset counter clock controller of FIG. 3 of one or more disclosed embodiments.

FIG. 3 illustrates an example offset counter clock controller 206 of the PPM frequency offset detector 200, according to one disclosed embodiment. As shown, the offset counter clock controller 206 includes a Latch A, 302, a Latch B, 304, and a start logic circuit 306 (e.g., an example implementation of the start logic circuit 306 is shown in FIG. 4).

Latch A, 302, and Latch B, 304 are configured to detect a faster clock signal of the first clock signal CLK_A and the second clock signal CLK_B, and the start logic circuit 306 controls counting (i.e., enables and disables counting) by the PPM frequency offset counter 208 of the faster clock signal. Each of Latch A, 302, and Latch B, 304 can be implemented with a D (data) latch, which outputs the data D input at the Q output when the timing control (clock) C input is asserted or high; otherwise, the Q output holds the same D input when the C input was last asserted. As shown, BIT_N_A provides an input C to the Latch A, 302, and BIT_N_B provides an input C to the Latch B, 304. BIT_N_A provides an inverted input D to the Latch B, 304, and BIT_N_B provides an inverted input D to the Latch A, 302. When the first clock signal CLK_A is faster than the second clock signal CLK_B, the Q output of Latch A, 302 goes high for FASTA. Otherwise, when the second clock signal CLK_B is faster than the first clock signal CLK_A, then the Q output of Latch B, 304 goes high for FASTB.

Returning to FIG. 5 as shown, the first clock signal CLK_A is faster than the second clock signal CLK_B, and waveform FASTA of the fast first clock signal CLK_A goes high synchronously with the waveform BIT_N_A of the fast first clock signal CLK_A going high. As shown, the waveform FASTB of the slow second clock signal CLK_B remains low because the first clock signal CLK_A is faster than the second clock signal CLK_B.

Alternatively (e.g., not shown in FIG. 5), when the second clock signal CLK_B is faster than the first clock signal CLK_A, FASTB goes high synchronously with the waveform BIT_N_B of the fast second clock signal CLK_B, and the waveform FASTA of the slow first clock signal CLK_A remains low because the second clock signal CLK_B is faster than the first clock signal CLK_A.

For example, in an embodiment, with an example 21-bit counters 202, 204, and the first and second clock signals CLK_A, CLK_B are 100 MHz clocks, the respective waveform BIT_N_A and waveform BIT_N_B or the $21^{st}$ bit go high at count 1048576. For example, another programmable bit number, such as the $15^{th}$ bit (e.g., count=32768) can be used to detect which of the first clock signal CLK_A and the second clock signal CLK_B is faster. In an embodiment, the programmable bit number is a user-programmable value based on a given application of the PPM frequency offset detector 200. In an embodiment, with 100 MHz clocks A, B, and 21-bit counters 202, 204, the programmable bit number N can be provided, for example in a range between $10^{th}$ bit and $21^{th}$ bit of the 21-bit counters 202, 204.

In FIG. 3, the latch outputs FASTA, FASTB are applied to the start logic circuit 306 together with the BIT_N_A, of the first clock signal CLK_A and BIT_N_B, of the second clock signal CLK_B. The start logic circuit 306 uses BIT_N_A, and BIT_N_B, and the latch outputs FASTA, FASTB to control which clock (e.g., CLK_A or CLK_B) is applied to the PPM frequency offset counter 208 and when the faster clock applied to the PPM frequency offset counter 208 is counted. The start logic circuit 306 applies the faster clock CLK_PPM to the PPM frequency offset counter 208 based on the latch outputs FASTA, FASTB of Latch A, 302, and Latch B, 304. The PPM frequency offset counter 208 receives the PPM Select signal at startup or power on of the PPM frequency offset detector 200 and the start logic circuit 306 of the offset counter clock controller 206 applies the CLK_PPM of the faster clock and enables counting by the PPM frequency offset counter 208 during an operational mode of the PPM frequency offset detector 200.

FIG. 4 illustrates details of an example implementation of the start logic circuit 306 of the offset counter clock controller 206 of the PPM frequency offset detector 200 of one disclosed embodiment. The start logic circuit 306 includes a pair of set-reset (SR) Latches 402, 404, which are asynchronous devices and rely on state of the S and R inputs independently of control signals. When a high input is applied to the S input of the SR Latches 402, 404, the Q output goes high, and is reset when a high input is applied to the R input of the SR Latches 402, 404. As shown, BIT_N-A is applied to the input S and BIT_N-B is applied to the input R of the SR Latch 402 to provide a high Q output of CLOCK_PPM_EN_A when BIT_N-A goes high, and is reset to provide a low Q output when the BIT_N-B goes high. As shown, BIT_N-B is applied to the input S and BIT_N-A is applied to the input R of the SR Latch 404 to provide high Q output of CLOCK_PPM_EN_B when BIT_N-B goes high, and reset to provide a low Q output when the BIT_N-A goes high when the first clock signal CLK_A is slower, i.e., the second first clock signal CLK_B is faster.

A first multiplexer (MUX) 406 (e.g., 2:1 multiplexer with 2 data lines and 1 select line) receives the Q output CLOCK_PPM_EN_A of the SR Latch 402 at input 0, the Q output CLOCK_PPM_EN_B of the SR Latch 404 at input 1, and FASTB at input S (select). An output CLOCK_PPM_EN_A is provided by the MUX 406 when the first clock signal CLK_A is the faster clock. An output CLOCK_PPM_EN_B is provided by MUX 406 when the second clock signal CLK_B is the faster clock. The MUX 406 provides an output CLOCK_PPM_EN (enable for the faster clock A, or the fastest clock B) to an input D of a pair of cascaded DFFs (D Flip-Flops) 408 and 410. In an embodiment, the cascaded DFFs 408 and 410 are edge triggered flip-flops that trigger on a positive or rising clock edge when the clock pulse is changing from zero (0) to one (1). The cascaded DFFs 408 and 410 are configured to provide delay of up to 2 clock pulses to enable a retimed enable output Q of the cascaded latch 410 with the faster clock to avoid susceptibility to clock slivering (i.e., to avoid missing a clock count with a short duration clock pulse or sliver clock pulse), preventing inaccurate counts for low PPM frequency offsets.

A second MUX 412 (e.g., 2:1 multiplexer) receives the first clock signal CLK_A at input 0, the second clock signal CLK_B at input 1, and FASTB at input S, providing a fastest clock output applied to an input 1 of a third MUX 414 (e.g., 2:1 multiplexer) and an input C to the cascaded DFFs 408 and 410. The cascaded DFFs 408 and 410 provides a Q retimed enable output of the cascaded latch 410 of CLOCK_PPM_EN_RETIMED, to input S of the third MUX 414. The third MUX 414 receives the retimed enable output Q of cascaded latch 410 of CLOCK_PPM_EN_RETIMED at its input S, with its input 0 connected to ground, and its input 1 of the faster clock signal output of the second MUX 412. The third MUX 414 provides the output CLK_PPM of the faster clock, which is received by the PPM frequency offset counter 208 of PPM frequency offset detector 200, as shown in FIGS. 2 and 3, such as illustrated by waveform CLK_PPM in FIG. 5 with the faster clock CLK_A.

As shown, the offset counter clock controller 206 of the PPM frequency offset detector 200 provides the faster clock signal at output CLK_PPM of the MUX 414 of the start logic circuit 306, enabled by the retimed enable signal CLOCK_PPM_EN_RETIMED applied to the select input of the MUX 414, to enable counting by the PPM frequency offset counter 208, using only the first clock signal CLK_A and the second clock signal CLK_B, eliminating the need for an additional reference clock signal for measuring the frequency offset between the first clock signal and the second clock signal.

Returning to FIG. 5, waveform CLK_PPM_EN goes high synchronously with the waveform BIT_N_A of the fast first clock signal CLK_A going high and the waveform FASTA, and remains high until waveform BIT_N_B of the slow second clock signal CLK_B goes high, as indicated by the Arrow DELAY. A waveform CLK_PPM_EN_RETIMED output of the cascaded DFF 410 includes a time delay, as indicated by arrow R (e.g., 1 cycle) following the waveform CLK_PPM_EN going high. As shown, waveform CLK_PPM of the faster clock is applied to the PPM frequency offset counter 208, which begins one clock pulse or ½ cycle after the start of waveform CLK_PPM_EN_RETIMED. In an embodiment, the time delay R of waveform CLK_PPM_EN_RETIMED from the waveform CLK_PPM_EN, avoids susceptible to clock slivering, where clock slivering can otherwise result with inaccurate counts for low PPM offsets. An output of the PPM frequency offset counter 208 waveform ERROR is asserted or goes high synchronously with waveform BIT_N_B of the slow second clock signal CLK_B going high.

Figure 6:
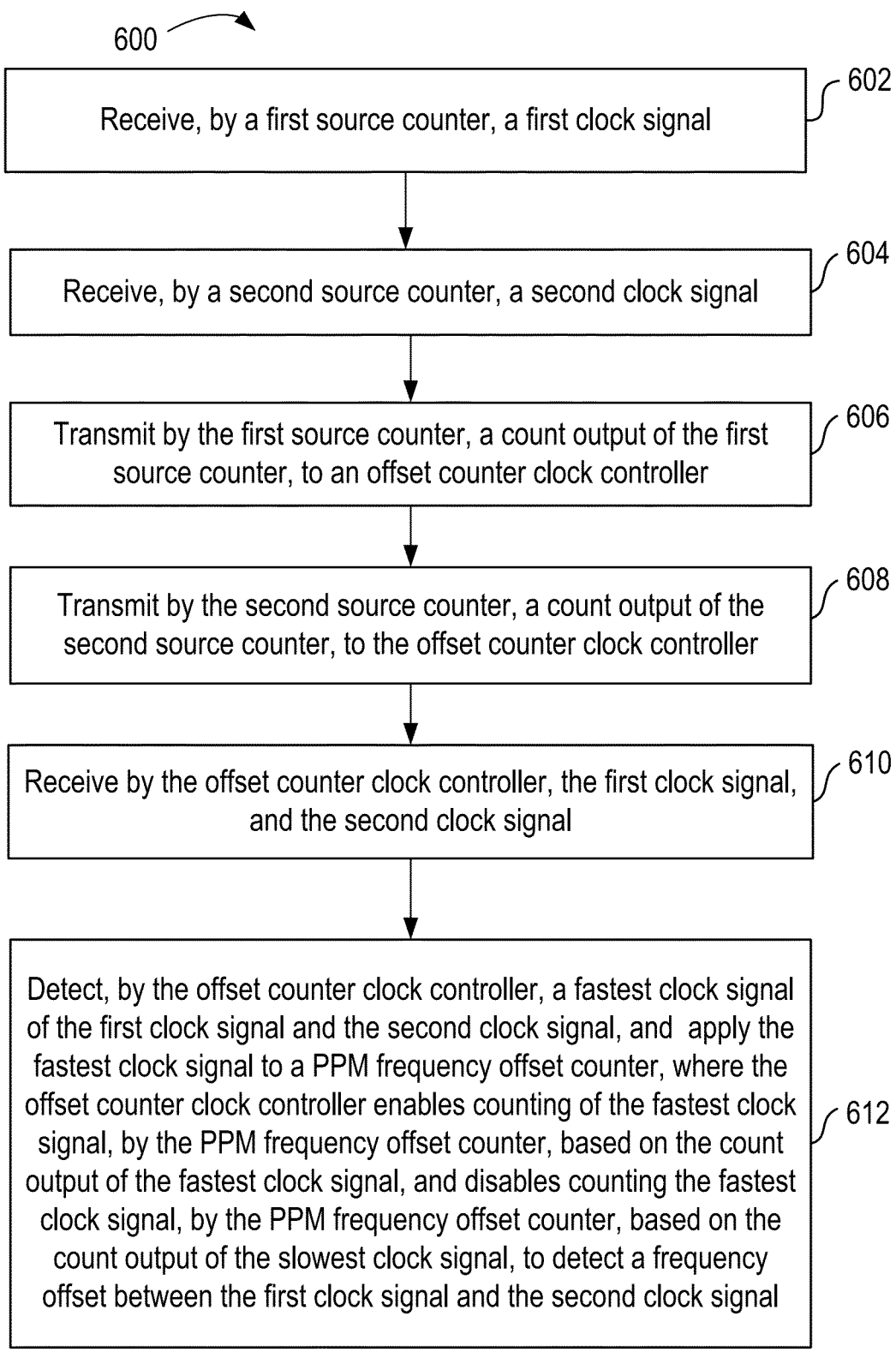
FIG. 6 is a flow chart illustrating example operational functions of one or more embodiments for PPM frequency offset detector of FIG. 2 of one or more disclosed embodiments.

FIG. 6 is a flow chart illustrating example operational functions of PPM frequency offset detector 200, according to one disclosed embodiment. At block 602, a first source counter receives a first clock signal from a first clock signal source. At block 604, a second source counter receives a second clock signal from a second clock signal source. In an embodiment, the first source counter and the second source counter are M bit counters (e.g., the counters 202 and 204 in FIG. 2), such as 21-bit counters of various suitable implementations. At block 606, the first source counter transmits a count output of the first source counter, to an offset counter clock controller (e.g., the offset counter clock controller 206 in FIG. 2). At block 608, the second source counter transmits the count output of the second source counter, to the offset counter clock controller. In an embodiment, the count output represents a programmable bit count, such as the $15^{th}$ bit (e.g., count=32768) or $21^{st}$ bit (e.g., count=1048576) of the first and second source 21-bit counters. At block 610, the offset counter clock controller receives the first clock signal and the second clock signal.

At block 612, the offset counter clock controller detects a fastest clock of the first clock signal and the second clock signal; and applies the faster clock signal to a PPM (parts per million) frequency offset counter (e.g., frequency offset counter 208 in FIG. 2), where the offset counter clock controller enables counting the fastest clock signal, by the PPM frequency offset counter, based on the count value of the faster clock signal, and disables the counting the faster clock signal based on the count output of the slowest clock signal, to detect a frequency offset between the first clock signal and the second clock signal.

While the foregoing is directed to embodiments of the present invention, other and further embodiments of the invention may be devised without departing from the basic scope thereof, and the scope thereof is determined by the claims that follow.

What is claimed is:

1. A method comprising:
receiving, by a first source counter, a first clock signal;
receiving, by a second source counter, a second clock signal;
transmitting by the first source counter, a count output of the first source counter, to an offset counter clock controller;
transmitting by the second source counter, a count output of the second source counter, to the offset counter clock controller;
receiving, by the offset counter clock controller, the first clock signal, and the second clock signal; and
detecting, by the offset counter clock controller, a faster clock signal of the first clock signal and the second clock signal, and applying the faster clock signal to a PPM (parts per million) frequency offset counter, wherein the offset counter clock controller enables counting the faster clock signal, by the PPM frequency offset counter, based on the count output of the faster clock signal, and disables counting the faster clock signal based on the count output of the slower clock signal, to detect a frequency offset between the first clock signal and the second clock signal.

2. The method of claim 1, further comprising:
generating an error signal output, by the PPM frequency offset counter, based on counting the faster clock signal.

3. The method of claim 1, wherein the first source counter and the second source counter, respectively, comprise an M-bit counter, and the count output of the first source counter and the second source counter, respectively, comprises a programmable N-bit count.

4. The method of claim 3, wherein the M-bit counters comprise 21-bit counters, the first clock signal and the second clock signal comprise 100 MHz clocks, and the programmable N-bit count is provided in a range between a $10^{th}$ bit and a $20^{th}$ bit of the 21-bit counters.

5. The method of claim 1, wherein detecting, by the offset counter clock controller, the faster clock signal of the first clock signal and the second clock signal further comprises providing a pair of data latches in the offset counter clock controller configured to detect the faster clock signal of the first clock signal and the second clock signal.

6. The method of claim 5, wherein the pair of data latches receive respective inputs of the count output of the first source counter and the count output of second source counter, and provide respective outputs of the faster clock signal of the first clock signal and the second clock signal based on the respective inputs.

7. The method of claim 1, wherein applying the faster clock signal to the PPM frequency offset counter further comprises providing a start logic circuit in the offset counter clock controller, and configuring the start logic circuit to apply the faster clock signal to the PPM frequency offset counter and to enable and disable counting the faster clock signal the PPM frequency offset counter.

8. The method of claim 7, wherein the start logic circuit comprises a pair of set-reset latches receiving the count output of the first source counter and the count output of the second source counter and providing respective enable outputs of the faster clock signal of the first clock signal and the second clock signal.

9. The method of claim 8, further comprises providing a pair of cascaded DFFs (D Flip-Flops) configured to receive an enable output of the faster clock and provide a retimed enable output of the faster clock signal.

10. The method of claim 9, further comprises providing a multiplexer configured to receive the faster clock signal of the first clock signal and the second clock signal, and the retimed enable output of the faster clock signal, and apply the faster clock signal to the PPM frequency offset counter.

11. A frequency offset detector comprising:
a first source counter configured to receive and count a first clock signal;
a second source counter configured to receive and count a second clock signal;
an offset counter clock controller coupled to the first source counter and the second source counter, the offset counter clock controller configured to receive the first clock signal, the second clock signal, a count output of the first source counter, and a count output of second source counter;
a PPM (parts per million) frequency offset counter coupled to the offset counter clock controller to detect a frequency offset between the first clock signal and the second clock signal;
wherein the offset counter clock controller is further configured to:
detect a faster clock signal of the first clock signal and the second clock signal, based on the count output of the first source counter, and the count output of second source counter;
apply the faster clock signal to the PPM frequency offset counter;
enable counting the faster clock signal, by the PPM frequency offset counter, based on the count output of the faster clock signal; and
disable the counting the faster clock signal, by the PPM frequency offset counter, based on the count output of the slower clock signal.

12. The frequency offset detector of claim 11, wherein the PPM frequency offset counter provides an error signal output, based on counting the faster clock signal.

13. The frequency offset detector of claim 11, wherein the first source counter and the second source counter, respectively, comprise an M-bit counter, and the count output of the first source counter and the second source counter, respectively, comprises a programmable N-bit count.

14. The frequency offset detector of claim 13, wherein the M-bit counters comprise 21-bit counters, the first clock signal and the second clock signal comprise approximately 100 MHz clocks, and the programmable N-bit count is provided in a range between a $10^{th}$ bit and a $20^{th}$ bit of the 21-bit counters.

15. The frequency offset detector of claim 11, wherein the offset counter clock controller comprises a pair of data latches that detect the faster clock signal of the first clock signal and the second clock signal based on respective inputs of the count output of the first source counter and the count output of second source counter.

16. The frequency offset detector of claim 15, wherein the pair of data latches provide respective latch outputs of the faster clock signal of the first clock signal and the second clock signal.

17. The frequency offset detector of claim 11, wherein the offset counter clock controller comprises a start logic circuit that applies the faster clock signal to the PPM frequency offset counter and enables the counting and disables the counting of the faster clock signal.

18. The frequency offset detector of claim 17, wherein the start logic circuit comprises a pair of set-reset latches that receive respective inputs of the count output of the first source counter and the count output of second source counter and provide respective enable outputs of the faster clock signal of the first clock signal and the second clock signal.

19. The frequency offset detector of claim 18, wherein the start logic circuit further comprises a pair of cascaded DFFs (D Flip-Flops) that receive an enable output of the faster clock and provide a retimed enable output of the faster clock signal.

20. The frequency offset detector of claim 19, wherein the start logic circuit further comprises a multiplexer that receives the faster clock signal of the first clock signal and the second clock signal, and the retimed enable output of the faster clock signal, and applies the faster clock signal to the PPM frequency offset counter.

* * * * *